US007126785B1

(12) United States Patent
Li et al.

(10) Patent No.: US 7,126,785 B1
(45) Date of Patent: Oct. 24, 2006

(54) MULTI-STAGE ACTUATOR DISK DRIVES, METHODS, AND COMPUTER PROGRAM PRODUCTS FOR SEEKING AND THEN MAINTAINING A TRANSDUCER ON TRACK

(75) Inventors: Yunfeng Li, San Jose, CA (US); Yu Sun, Freemont, CA (US); Lin Guo, Saratoga, CA (US)

(73) Assignee: Maxtor Corporation, Longmont, CO (US)

( * ) Notice: Subject to any disclaimer, the term of this patent is extended or adjusted under 35 U.S.C. 154(b) by 46 days.

(21) Appl. No.: 10/963,665

(22) Filed: Oct. 13, 2004

Related U.S. Application Data

(60) Provisional application No. 60/576,859, filed on Jun. 3, 2004.

(51) Int. Cl.
G11B 5/596 (2006.01)
G11B 21/02 (2006.01)
(52) U.S. Cl. .................................. 360/78.05; 360/77.02
(58) Field of Classification Search ............. 360/78.05, 360/77.02
See application file for complete search history.

(56) References Cited

U.S. PATENT DOCUMENTS 6,707,633 B1    3/2004  Okuyama et al. ............. 360/75
6,833,974 B1 *  12/2004 Koso et al. ............. 360/78.05

OTHER PUBLICATIONS

Singer et al.; *An Efficient Algorithm for the Generation of Multiple-Mode Input Shaping Sequences*, IEEE International Conference on Control Applications, Sep. 15-18, 1996, pp. 373-378.

Yamaguchi et al.; *Improvement of Settling Response of Disk Drive Head Positioning Servo Using Mode Switching Control with Initial Value Compensation*, IEEE Transactions on Magnetics, May 1996, vol. 32, No. 3, pp. 1767-1772.

Kobayashi et al.; *Track Seek Control for Hard Disk Dual-Stage Servo Systems*, IEEE Transactions on Magnetics, Mar. 2001, vol. 37, No. 2, pp. 949-954.

Mizoshita et al.; *Vibration Minimized Access Control for Disk Drives*, IEEE Transactions on Magnetics, May 1996, vol. 32, No. 3, pp. 1793-1798.

Tomizuka; *Zero Phase Error Tracking Algorithm for Digital Control*, Journal of Dynamic Systems, Measurement, and Control; Mar. 1987, vol. 109, pp. 65-68.

* cited by examiner

Primary Examiner—Wayne Young
Assistant Examiner—Jason Olson
(74) Attorney, Agent, or Firm—Meyers Bigel Sibley & Sajovec, PA

(57) ABSTRACT

Disk drives, methods, and computer program products are provided for controlling seeking of a transducer that is adjacent to a rotatable data storage disk in a disk drive. The disk drive includes a secondary actuator for positioning the transducer over a second range of movement, and a primary actuator for positioning the secondary actuator over a first range of movement that is larger than the second range of movement. The secondary actuator is controlled to move the transducer toward a target track on the disk while seeking. The primary actuator is controlled to move the secondary actuator toward the target track while simultaneously controlling the secondary actuator to maintain the transducer on the target track.

27 Claims, 5 Drawing Sheets

MULTI-STAGE ACTUATOR DISK DRIVES, METHODS, AND COMPUTER PROGRAM PRODUCTS FOR SEEKING AND THEN MAINTAINING A TRANSDUCER ON TRACK

RELATED APPLICATION

This application claims the benefit of and priority to U.S. Provisional Patent Application Ser. No. 60/576,859, filed Jun. 3, 2004, and entitled "METHOD FOR POSITION-MODE SEEK CONTROL FOR DUAL-STAGE ACTUATOR SERVO SYSTEMS", the disclosure of which is hereby incorporated herein by reference as if set forth in its entirety.

FIELD OF THE INVENTION

The present invention relates to disk drives and, more particularly, to methods, apparatus, and computer program products for transducer positioning in disk drives.

BACKGROUND OF THE INVENTION

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks. The disk is rotated by a spindle motor at a high speed, allowing the transducer to access different sectors within each track on the disk.

The actuator arm is coupled to a motor or coarse actuator, such as a voice coil motor (VCM), to move the actuator arm such that the transducer moves radially over the disk. Operation of the coarse actuator is controlled by a servo control system. The servo control system generally performs two distinct functions: seek control and track following. The seek control function includes controllably moving the actuator arm such that the transducer is moved from an initial position to a target track position. In general, the seek function is initiated when a host computer associated with the computer disk drive issues a command to read data from or write data to a target track on the disk.

As the transducer approaches the target track, the servo control system initiates a settle mode to bring the transducer to rest over the target track within a selected settle threshold, such as a percentage of the track width from track center. Thereafter, the servo control system enters the track following mode wherein the transducer is maintained at a desired position with respect to the target track (e.g., over a centerline of the track) until desired data transfers are complete and another seek is performed.

The ability to precisely position a transducer with respect to a track being followed has become increasingly important, as data and track densities in disk drives have increased. In particular, the space between adjacent tracks has become increasingly small, and the tracks themselves have become increasingly narrow. In order to increase the precision with which a transducer may be positioned with respect to a track during track following, an articulated actuator arm may be used. In general, the angle of the distal portion, or second stage, of the actuator arm with respect to the main portion, or first stage, of the actuator arm is controlled by a microactuator. By operating the microactuator to introduce small changes in the position of the transducer with respect to a track being followed, the accuracy of track following operations may be increased. However, because of the relatively small range of motion provided by microactuators, their range of motion is easily saturated.

As will be appreciated, a disk drive is primarily utilized to transfer data between the tracks of the disks and the host computer. Such data transfer operations usually do not occur during a seek, but rather take place when the drive is in track following mode. Hence, to maximize disk drive data transfer rate capabilities, disk drives may attempt to obtain minimum average seek times.

SUMMARY OF THE INVENTION

Some embodiments of the present invention provide methods of controlling seeking of a transducer that is adjacent to a rotatable data storage disk in a disk drive. The disk drive includes a secondary actuator for positioning the transducer over a second range of movement, and a primary actuator for positioning the secondary actuator over a first range of movement that is larger than the second range of movement. The secondary actuator is controlled to move the transducer toward a target track on the disk while seeking. The primary actuator is controlled to move the secondary actuator toward the target track while simultaneously controlling the secondary actuator to maintain the transducer on the target track.

In some further embodiments of the present invention, the secondary actuator is extended toward the target track when seeking, and the primary actuator moves the secondary actuator toward the target track while retracting the secondary actuator until the secondary actuator is retracted to about a predetermined location (e.g., median location) within the second range of movement. Subsequent seeks from the target track to another track may be delayed until the secondary actuator is retracted to within a predetermined offset from the predetermined location within the second range of movement.

In some further embodiments of the present invention, a determination is made as to whether the seek distance for a subsequent seek from the target track to another track is at least a threshold distance. The subsequent seek may then be selectively allowed when the seek distance is determined to be at least the threshold distance, and it may be otherwise delayed until the secondary actuator is retracted to within a predetermined offset from a predetermined location within the second range of movement. The subsequent seek may be allowed when the seek direction is determined to be toward the initial track (i.e., the direction in which the secondary actuator is retracting), and it may be otherwise delayed until the secondary actuator is retracted to within a predetermined offset from a predetermined location within the second range of movement.

In some other embodiments of the present invention, a disk drive includes a data storage disk, a transducer, a primary actuator, a secondary actuator, and a controller. The transducer is configured to read data from the disk and/or to write data to the disk. The secondary actuator is configured to position the transducer relative to the disk over a second range of movement. The primary actuator is configured to position the secondary actuator relative to the disk over a first range of movement that is larger than the second range of movement. The controller is configured to seek the transducer to a target track on the disk by controlling the secondary actuator to move the transducer toward the target track, and then controlling the primary actuator to move the secondary actuator toward the target track while simultaneously controlling the secondary actuator to maintain the transducer on the target track.

Some other embodiments of the present invention provide a computer program product for controlling seeking of a transducer using a primary actuator and a secondary actuator. The computer program product includes computer program code embodied in a computer-readable storage medium, and that is configured to control the secondary actuator to move the transducer toward a target track on the disk while seeking, and configured to control the primary actuator to move the secondary actuator toward the target track and to simultaneously control the secondary actuator to maintain the transducer on the target track.

DETAILED DESCRIPTION OF THE INVENTION

Figure 1:
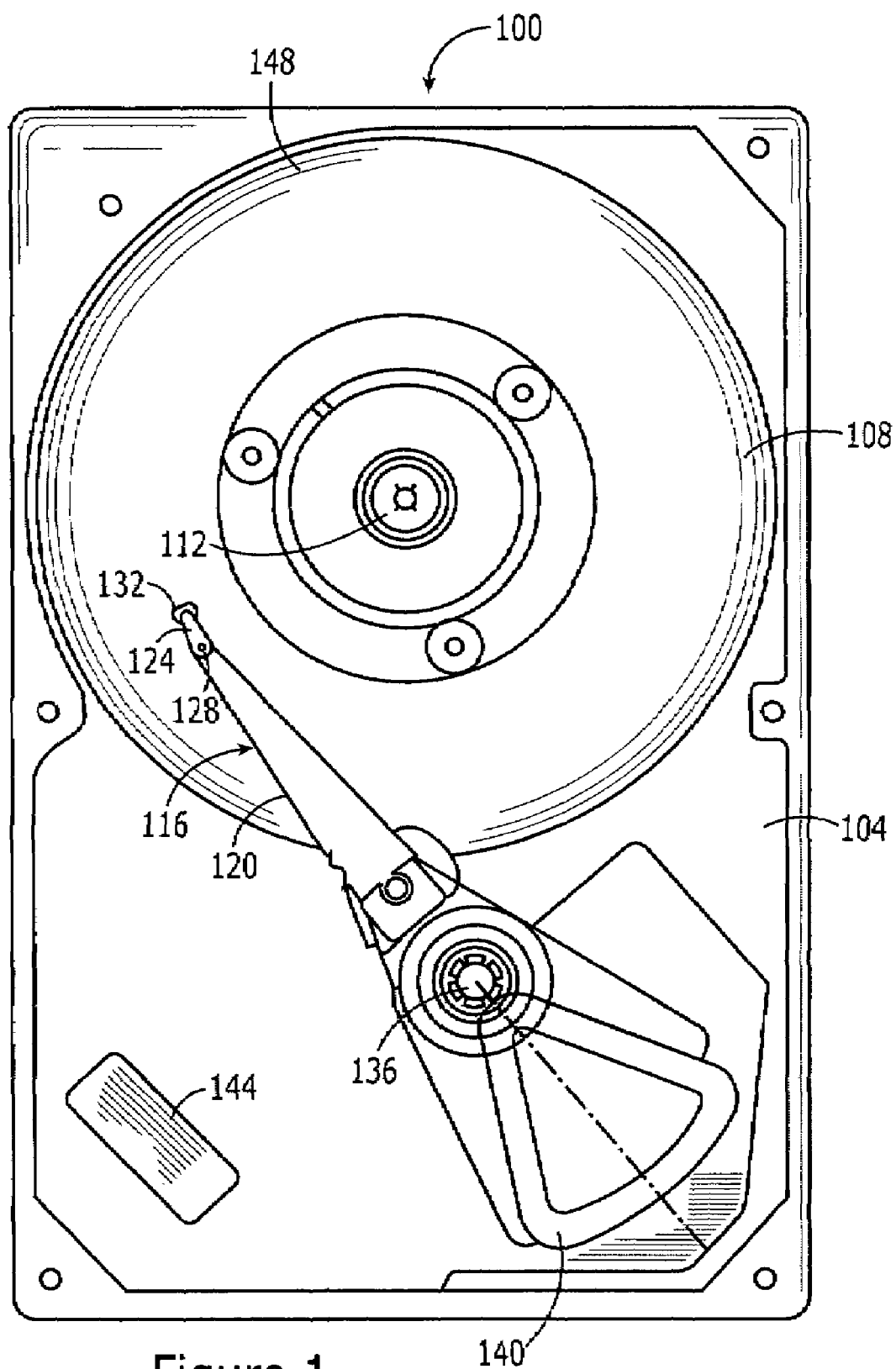
FIG. 1 is a block diagram of a disk drive having dual actuators and a controller configured to seek and position a transducer according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items.

The present invention may be embodied as disk drives, methods, and/or computer program products. Accordingly, the present invention may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disk read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams, including operational flow charts, of disk drives, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1 illustrates a computer disk drive with a dual stage actuator. The disk drive, generally identified by reference number 100, includes a base 104 and one or more data storage disks 108 (only one of which is shown in FIG. 1). The disk 108 may be a magnetic disk, an optical disk, or any other type of data storage disk, and which may have data storage tracks defined on one or both of its storage surfaces. The disk 108 is interconnected to the base 104 by a spindle motor (not shown) mounted within or beneath the hub 112, such that the disk 108 can be rotated relative to the base 104.

An actuator arm assembly 116 includes a first member 120 and a second member 124. The first member 120 is coupled between the base 104 and the second member 124, and the members 120 and 124 can provide two stages of movement. Interconnecting the first stage 120 and the second stage 124 of the actuator arm assembly 116 is a microactuator 128, also referred to later as a secondary actuator. A transducer 132 is mounted on a distal portion of the actuator arm assembly 116. In particular, the transducer 132 can be coupled to an end of the second member 124 of the actuator arm assembly 116 so that it can be positioned adjacent to a storage surface of the disk 108. Although only one actuator arm assembly 116 is shown in FIG. 1, it is to be understood that a plurality of the actuator arm assemblies 116 may be interconnected and configured to position a transducer adjacent to each respective data storage surface of a stack of the disks 108.

The first member 120 of the actuator arm assembly 116 can be interconnected to the base 104 by a bearing 136. A coarse actuator 140, also referred to later as a primary actuator, can pivot the actuator arm assembly 116 about the bearing 136 to position the microactuator 128 and, thereby, position the transducer 132 with respect to the disk 108. In particular, the coarse actuator 140 positions the transducer 132 to allow it to access different data tracks or cylinders 148 on the disk 108. The coarse actuator 140 is configured to position the microactuator 128 and, thereby, the transducer 132 over a first range of movement that may correspond to the distance between an inner and outer diameter of the storage surface of the disk 108. The coarse actuator 140 may be, for example, a motor such as a VCM.

The articulation of the second member 124 with respect to the first member 120 of the actuator arm assembly 116 may be achieved by, for example, providing a journal bearing as part of the microactuator 128, by providing a flexible interconnection between the second member 124 and the first member 120, or by otherwise joining the second member 124 to the first member 120 in such a way that the second member 124 is allowed to move with respect to the first member 120.

The microactuator 128 is configured to position the transducer 132 relative to the disk 108 over a second range of movement that is less than the first range of movement provided by the coarse actuator 140. The microactuator 128 may affect finer positioning and/or higher frequency movements of the transducers 132 within its range of movement (e.g., over relatively short distances), such as that which may be encountered during short seeks (e.g., a few tracks) or during track following, compared to the coarse actuator 140. The microactuator 128 may be any mechanism capable of moving the transducer 132 relative to the disk 108, such as by adjusting the second member 124 of the actuator arm assembly 116 with respect to the first member 120. For example, the microactuator 128 may be a piezoelectric actuator, an electromagnetic actuator, or an electrostatic actuator. Accordingly, the microactuator 128 may move the transducer 132 faster across the disk 108, within its range of movement, than may be possible with the coarse actuator 140.

A controller 144 is configured to control movement of the coarse actuator 140 and the microactuator 128. The controller 144 is configured to seek the transducer 132 from an initial track to a target track using the coarse actuator 140, the microactuator 128, and/or a combination of the coarse actuator 140 and the microactuator 128. The controller 144 may be configured to determine whether a seek distance from a current position of the transducer 132 to the target track is within the range of movement (i.e., within the reach) of the microactuator 128. When the seek distance is beyond the range of movement of the microactuator 128, the controller 144 may control the coarse actuator 140 to seek the transducer 132 to the target track. However, when the seek distance is within the range of movement of the microactuator 128, the controller 144 may control the microactuator 128 to move the transducer 132 to the target track. Using the microactuator 128 to seek the transducer 132 over a short distance to a target track may allow faster seek operations to be performance, compared to when the coarse actuator 140 alone is used to seek the transducer 132.

The controller 144 may simultaneously control both the coarse actuator 140 and microactuator 128 when seeking the transducer 132. For example, the controller 144 may control the microactuator 128 to rapidly move the transducer 144 toward the target track while controlling the coarse actuator 140 to move the microactuator 128 and, thereby, the transducer 144 toward the target track. When the seek distance is within the range of movement of the microactuator 128, the transducer 128 may be primarily moved to the target track by the microactuator 128. As will be appreciated by one having skill in the art, the coarse actuator 140 and the microactuator 128 may be simultaneously controlled by the controller 144 by multitasking between operations that separately control the coarse actuator 140 and the microactuator 128, and/or the controller 144 may include two or more control units that control the coarse actuator 140 and the microactuator 128 in parallel.

Following a seek to the target track, the controller 144 may control the coarse actuator 140 and the microactuator 128 in a track following mode to maintain the transducer 132 on the target track while data is read from and/or written to the target track. When the microactuator 128 is used to seek the transducer 132, it may be extended to near a limit of its range of movement. If the microactuator 128 were left near its movement limit, it may become constrained by that limit while being used for track following, and which may cause the transducer 132 to unacceptably vary from a desired position on the track. According to various embodiments of the present invention, the controller 144 is configured to control the coarse actuator 140 to move the microactuator 128 toward the target track while simultaneously controlling the microactuator 128 to maintain the transducer 132 on the target track. For example, the controller 144 may extend the microactuator 128 to move the transducer 132 to the target track during a seek, and it may control the coarse actuator 140 to move the microactuator 128 toward the target track while retracting the microactuator 128 until the microactuator 128 is retracted to about a predetermined location, such as a median location, within its the range of movement. The microactuator 128 may thereby be used to quickly seek the transducer 132 to the target track, and then its available range of movement can be recovered as the coarse actuator 140 moves the microactuator 128 closer to the target track, and while the transducer 132 is maintained on the target track.

Figure 2:
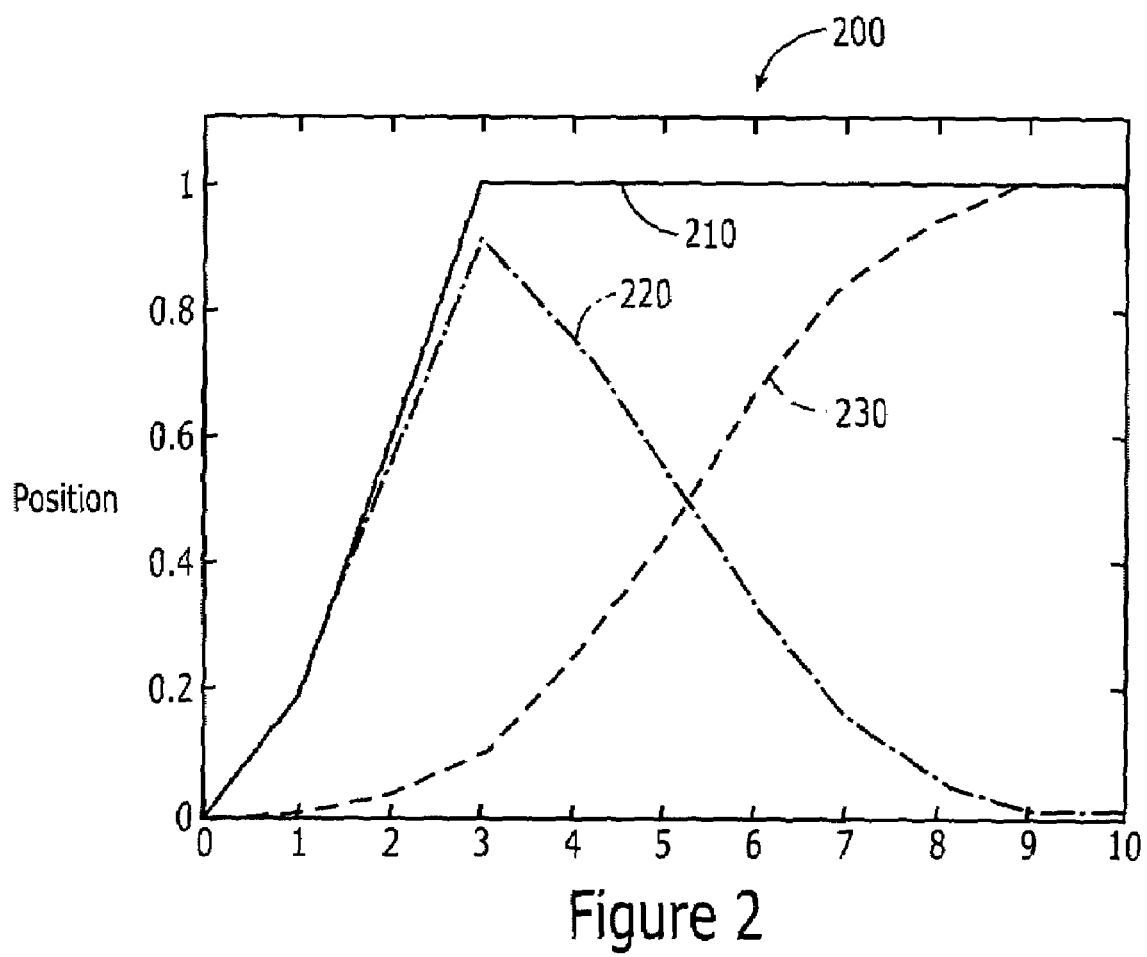
FIG. 2 is a graph illustrating results of simulations of the radial path of a transducer during a one track seek and subsequent track following, and the associated radial paths and of a microactuator and a coarse actuator, according to some embodiments of the present invention

With additional reference now to FIG. 2, a graph 200 is shown that represents results of simulations of the radial path 210 of the transducer 132 during a one track seek from an initial track to an adjacent target track and the subsequent following of the target track, and the associated radial paths 220 and 230 of the microactuator 128 and the coarse actuator 140, respectively, according to some embodiments of the present invention. The x-axis represents sampled times in the simulation, and the y-axis represents radial locations between the initial track (i.e., position "0") and the adjacent target track (i.e., position "1"). As shown in FIG. 2, the microactuator 128 is extended radially along path 220 between sample times 0 to 3 to quickly seek the transducer 132 along corresponding path 210 toward the target track. At sample time 0, the coarse actuator 140 is also controlled to begin moving the microactuator 128 toward the target track. At sample time 3, the transducer 132 is located on the target track, and it may be used to read data from and/or write data to the target track. Also at sample time 3, the microactuator 128 begins retracting (i.e., moved in an opposite direction to the previous extension) toward a median location within its range of movement while the coarse actuator 140 continues to move the microactuator 128 toward the target track. The retracting of the microactuator 128 and the movement of the coarse actuator 140 are controlled so that the transducer 132 remains on track. Accordingly, reading and/or writing of data on the target track may be carried out while the microactuator 128 recovers its range of movement after sample time 3.

Figure 3:
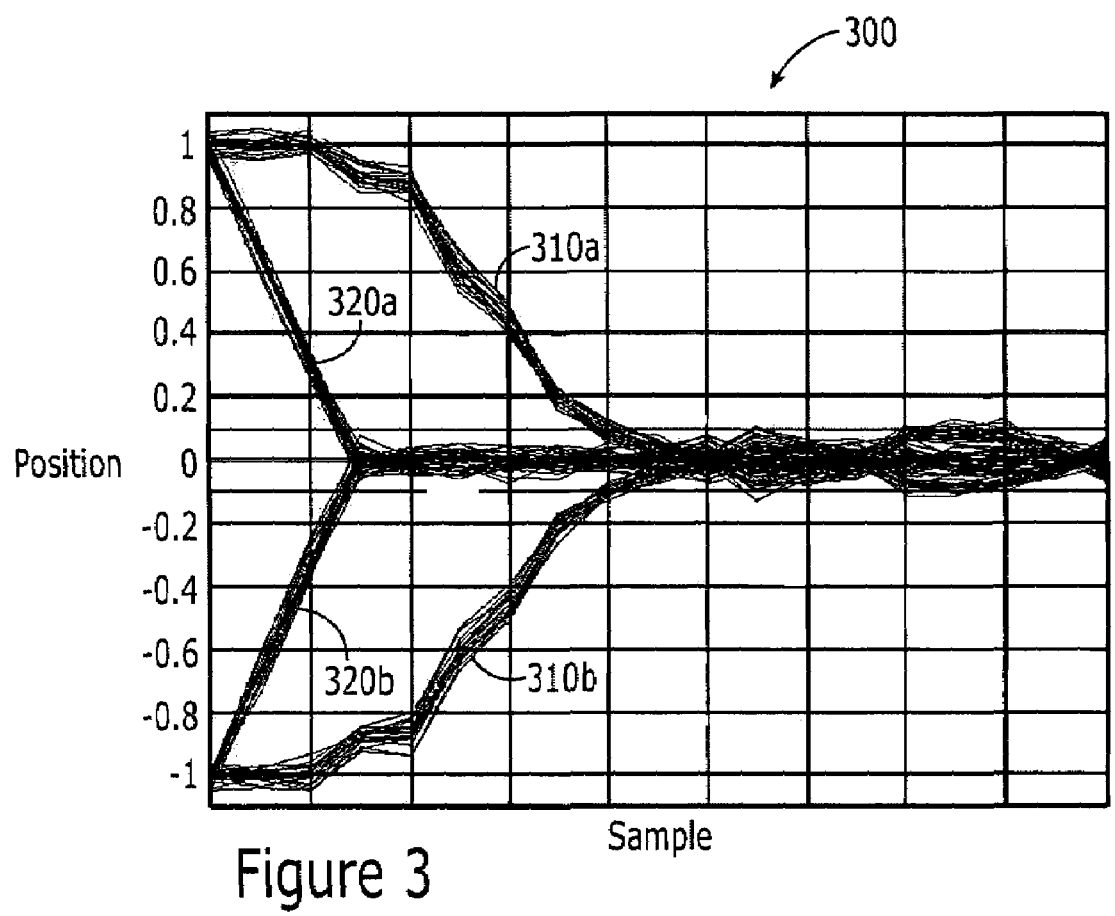
FIG. 3 is a graph illustrating results of simulations of a one track seek primarily using the microactuator or the coarse actuator of FIG. 1.

With reference now to FIG. 3, a graph 300 is shown that represents results of simulations of the radial paths 310*a–b* and 320*a–b* of the transducer 132 during one track seeks and the subsequent following of the target track. The x-axis represents sampled times in the simulation, and the y-axis represents radial locations between two initial tracks (i.e., positions "1" and "−1") on opposite sides of the adjacent target track (i.e., position "0"). When the microactuator 128 is primarily used to seek the transducer 132, the transducer 132 is quickly moved along path 320*a* from the initial track position 1 to the target track position 0, and settles on the target track in about 3 sample times. A similar path 320*b* is obtained when the microactuator 128 is primarily used to seek the transducer 132 from the opposite initial track position −1 to the target track position 0. In contrast, when the coarse actuator 140 is used to seek the transducer 132, the transducer 132 is more slowly moved along path 310*a* from the initial track position 1 to the target track position 0, and settles on the target track in about 10 sample times. A similar path 310*b* is obtained when the coarse actuator 140 is primarily used to seek the transducer 132 from the opposite initial track position −1 to the target track position 0. Accordingly, seek operations that are within the range of movement of the microactuator 128 may be more quickly performed by primarily using the transducer 132 to seek the transducer 132, rather then primarily using the coarse actuator 140.

Figure 4:
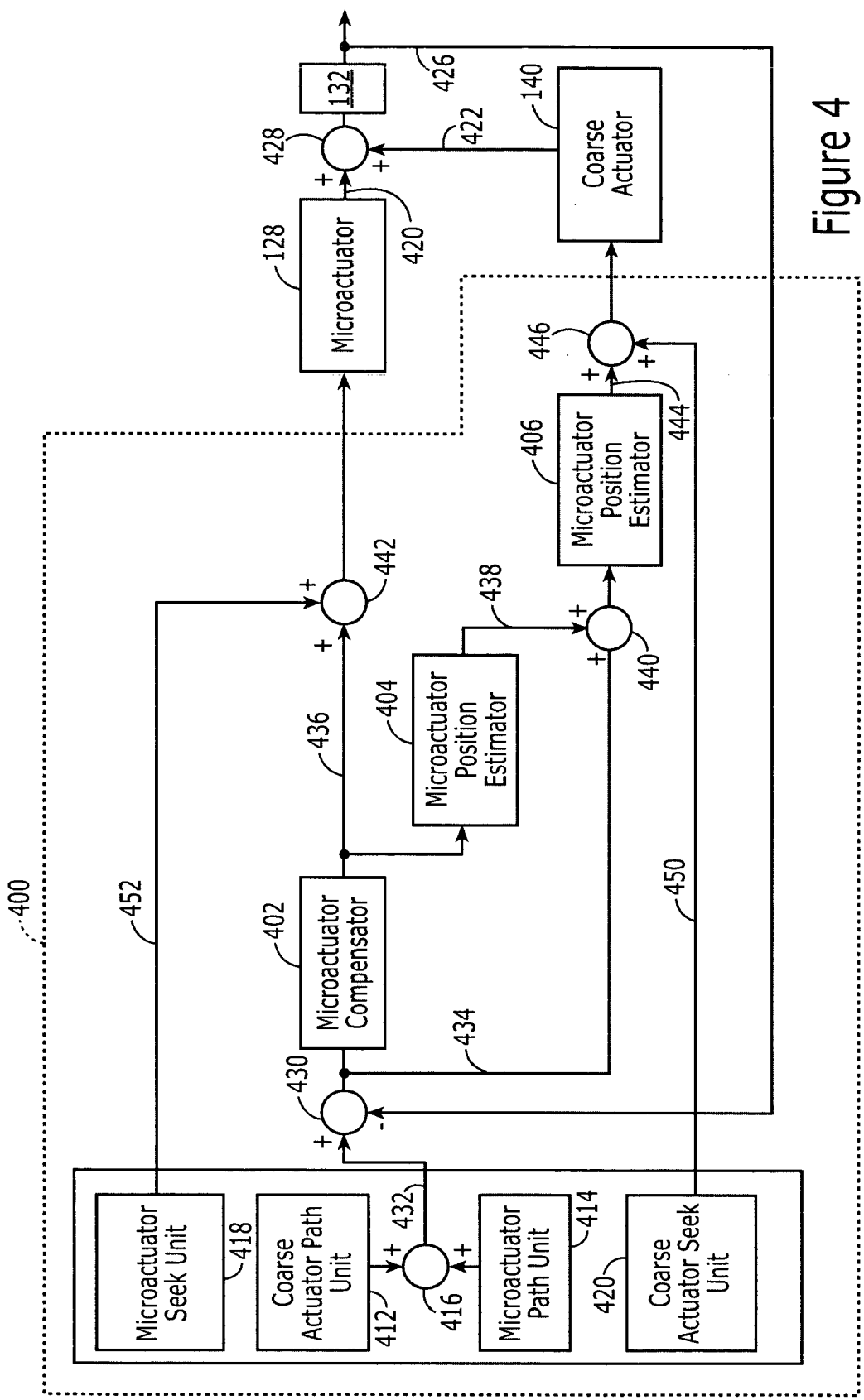
FIG. 4 is a block diagram of a microactuator, a coarse actuator, and a controller configured to seek and position a transducer according to some embodiments of the present invention.

With reference now to FIG. 4, a block diagram is shown of a controller 400 that is configured to control the microactuator 128 and the coarse actuator 140, and which may be suitable for use as the controller 144 of FIG. 1, according to some embodiments of the present invention. The controller 400 includes a microactuator compensator 402, a microactuator position estimator 404, a coarse actuator compensator 406, and a control unit 410. The controller 400 may be embodied as hardware and/or software. The control unit 410 includes a coarse actuator path unit 412, a microactuator path unit 414, a microactuator feed-forward signal unit 418, and a coarse actuator feed-forward signal unit 420.

The position of the transducer 132 relative to a track can depend on a summation, performed at summing node 428, of the transducer positioning contributions 420 and 422 by the microactuator 128 and the coarse actuator 140. The controller 400 senses the position of the transducer 132 relative to a track, via the transducer 132, as a sensed position signal 426 based on, for example, servo patterns along the track. The sensed position signal 426 is fed-back to a summing node 430, where it is combined with a desired reference position signal 432 to generate a position error signal 434. The desired reference position signal 432 is generated by the control unit 410 as a summation, by summing node 416, of a reference signal from the coarse actuator path unit 412 and a reference signal from the microactuator path unit 414. During a track following mode, the desired reference position signal 432 may be a DC value, such as zero, to drive the transducer 132 toward a centerline of the track.

The microactuator compensator 402 is configured to control movement of the microactuator 128 based on the position error signal 434. For example, the microactuator compensator 402 generates a microactuator control signal 436 that compensates for high frequency components of the position error signal 434. The microactuator 128 can then effect high frequency movements of the transducer 132 within its range of movement based on the control signal 436. The microactuator position estimator 404 estimates the position of the microactuator 128 in its range of movement and generates an estimated microactuator position signal 438. The estimated microactuator position signal 438 is combined at a summing node 440 with the position error signal 434 and provided to the coarse actuator compensator 406.

The coarse actuator compensator 406 controls movement of the coarse actuator 140, via a coarse actuator control signal 444, based on the estimated microactuator position signal 438 and based on the position error signal 434. Accordingly, the response of the coarse actuator compensator 206 takes into account an estimate of the response of the microactuator 128 to the position error signal 234.

The coarse actuator seek unit 420 is configured to control seeking of the transducer 132 by the coarse actuator 140 through a feed-forward signal 450 that it generates, and which is combined with the coarse actuator control signal 444 at summing node 446. The microactuator seek unit 418 is configured to control seeking of the transducer 132 by the microactuator 128 through a feed-forward signal 452 that it generates, and which is combined with the microactuator control signal 436 at summing node 442. A seek operation can thereby be performed by the coarse actuator seek unit 420 controlling the coarse actuator 140 to move the microactuator 128 and the transducer 132 toward the target track, and/or by the microactuator seek unit 418 controlling the microactuator 128 to move the transducer 132 toward the target track.

The coarse actuator seek unit 420 and the microactuator seek unit 418 can be configured to simultaneously control the coarse actuator 140 and the microactuator 128 to seek the transducer 132 to a target track, such as was explained with regard to FIG. 2. The shape of the feed-forward signals 450 and 452 generated by the coarse actuator seek unit 420 and the microactuator seek unit 418 may be defined so that the transducer 132 can reach the target track as soon as possible with an acceptable level of residual vibration. For example, the shape of the feed-forward signals 450 and 452 may be defined based on the known attributes of the dynamics of the coarse actuator 140 and the microactuator 128.

The microactuator seek unit 418 can be configured to generate the feed-forward signal 452 having a shape that controls the microactuator 128 to move the transducer 132 to the target track so as to reduce seek time, while avoiding resonance modes that the microactuator 128 may be subject to and which may delay settling onto the target track. The coarse actuator seek unit 420 can be configured to generate the feed-forward signal 450 having a shape that controls the coarse actuator 140 to accelerate and decelerate the actuator assembly 116 while moving the microactuator 128 toward the target track so as to reduce vibrations associated with change in motion of the actuator assembly 116, and/or to reduce track misregistration of the transducer 132 after it reaches the target track. The feed-forward signals 450 and 452 may be shaped/filtered using, for example, a finite impulse response filter, an infinite impulse response filter, input shaping, minimum-jerk control, and/or other techniques to cause a fast seek and acceptable settling of the transducer 132 on the target track. One or both of the seek units 418 and 420 may generate the feed-forward signals 450 and 452 at multiple rates of the position error signal 434.

The microactuator seek unit 418 may generate the feed-forward signal 452 based on the technique described in "An Efficient Algorithm for the Generation of Multiple-Mode Input Shaping Sequences", by N. C. Single et al., Proc. IEEE Conf. on Control Applications, pp. 373–378, September, 1996, the disclosure of which is incorporated herein by reference. The coarse actuator seek unit 420 may generate the feed-forward signal 450 to minimize jerk and to reduce off track error using, for example, the techniques described in "Vibration Minimized Access Control For Disk Drives", by Y. Mizoshita et al., IEEE Transactions on Magnetics, Vol. 32, No. 3, May 1996, and by "Zero Phase Error Tracking Algorithm for Digital Control", by M. Tomizuka, Journal of Dynamic Systems, Measurements, and Control, Vol. 109, March 1987, the disclosures of which are incorporated herein by reference.

The control unit 410 may be configured to control the timing of seeks from a present track based on completion of retraction of the microactuator 128 to a predetermined location within its range of movement, based on the seek distance, and/or based on the direction of the seek. Controlling when seeks are allowed to occur may avoid the microactuator 128 becoming constrained by its limited range of movement. For example, while the microactuator 128 is still retracting from a seek operation, the control unit 410 may determine whether a subsequent seek distance, from a track where the transducer 132 is presently located to another track, is at least a threshold distance. The control unit 410 may then selectively allow the subsequent seek when the seek distance is at least a threshold distance, and it may delay the subsequent seek when the seek distance is less than the threshold distance until the microactuator 128 is retracted to within a predetermined offset from the predetermined location within its range of movement. The threshold distance may be selected to allow sufficient time for the microactuator 128 to be fully retracted during the seek operation before the new target track is reached. The predetermined offset may be selected to allow sufficient time for the microactuator 128 to be fully retracted during a seek operation that can be shorter than the threshold distance.

After performing a seek operation from an initial track to a target track, and while the microactuator 128 is retracting from the seek operation, the control unit 410 may determine whether a subsequent seek from the present target track to another track is back toward the initial track, and may selectively allow the subsequent seek when the seek direction is determined to be toward the initial track. The control unit 410 may delay the subsequent seek when the seek direction is away from the initial track until the microactuator 128 is retracted to within the predetermined offset from the predetermined location within its range of movement. Accordingly, when a subsequent seek would move the microactuator 128 in the direction that it is presently retracting, the seek may be allowed to occur before the microactuator 128 has fully retracted because the microactuator 128 may recover its range of movement during the seek. In contrast, when the seek would move the microactuator 128 away from the direction that it is presently retracting, the seek may be delayed.

Figure 5:
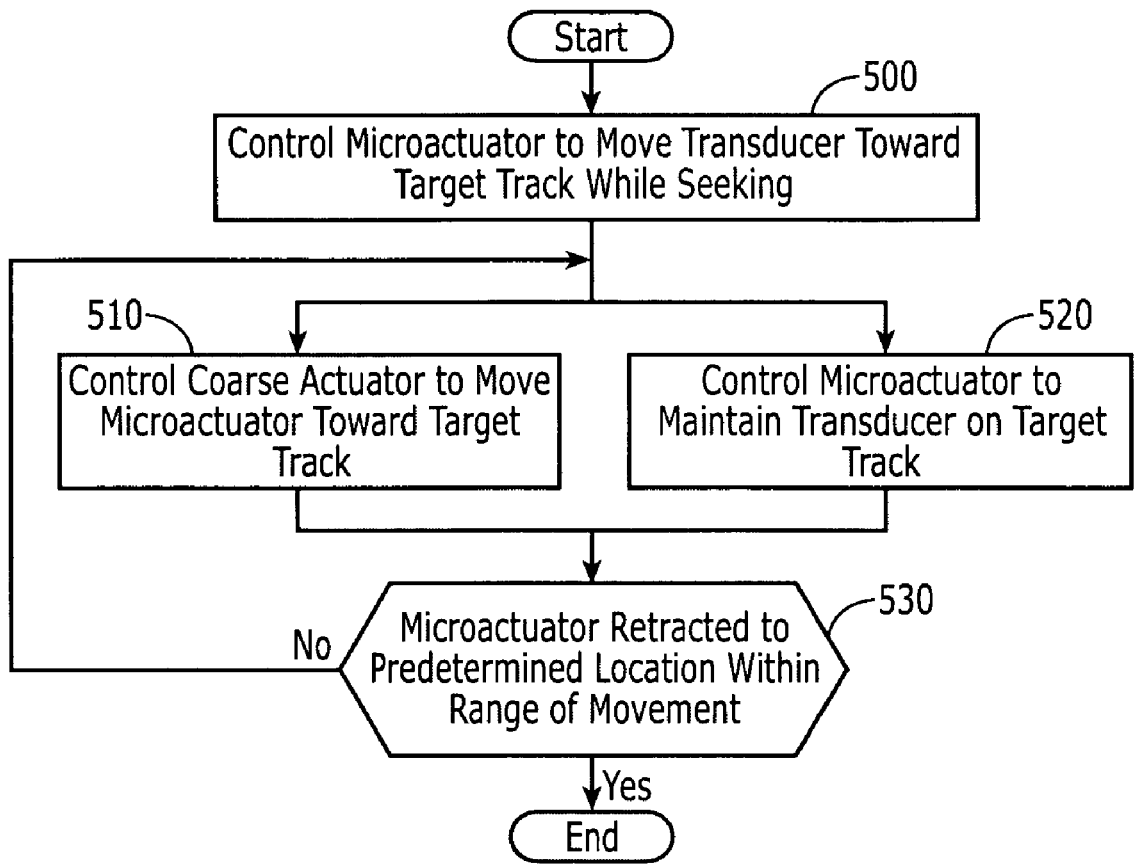
FIG. 5 is a flowchart illustrating operations for controlling a coarse actuator and a microactuator to seek a transducer to a target track, and then for maintaining the transducer on the track while moving the microactuator toward the target track.

Referring now to FIG. 5, a flowchart of operations is shown for seeking a transducer using the coarse actuator 140 and the microactuator 128 according to some embodiments of the present invention. These operations may be carried out by the controller 144 and/or 400. At Block 500, the microactuator 128 is controlled to move the transducer 132 toward a target track during a seek operation. At Block 510, the coarse actuator 140 is controlled to move the microactuator 128 toward the target track. At Block 520, while the coarse actuator 140 is moving the microactuator 128, the microactuator 128 is controlled to maintain the transducer 132 on the target track. Accordingly, the microactuator 128 is retracted while the coarse actuator 140 moves the microactuator 128 toward the target track, and the movements are coordinated so that the transducer 132 remains on the target track. At Block 530, a decision is made as to whether the microactuator 128 has retracted to a predetermined location within its range of movement, and, if so, the operations end. Otherwise, the operations loop back to Blocks 510 and 520 to continue controlling the coarse actuator 140 and the microactuator 128 as described above.

For purposes of illustration only, the actuators 128 and 140 have been referred to above as a microactuator and a coarse actuator, respectively, in accordance with some embodiments of the present invention. However, it is to be understood that the present invention is not limited to use with microactuators and coarse actuators. Instead, the controllers 144 and 400 of FIGS. 1 and 4 can be configured to control a primary actuator and a secondary actuator, such that actuator 140 can be referred to as a primary actuator and the actuator 128 can be referred to as a secondary actuator. The primary actuator can have a greater range of movement than the secondary actuator, but may have a lower rate of response to control commands. Moreover, although the foregoing discussion has been in the context of a disk drive having two actuators, the present invention is not so limited to such embodiments. Instead, the present invention may be applied to any disk drive system having more than one actuator.

The foregoing discussion of the invention has been presented for purposes of illustration and description. Further, the description is not intended to limit the invention to the form disclosed herein. Consequently, variations and modifications commensurate with the above teachings are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments.

What is claimed is:

1. A method of controlling seeking of a transducer that is adjacent to a rotatable data storage disk in a disk drive, the disk drive having a secondary actuator for positioning the transducer over a second range of movement, and a primary actuator for positioning the secondary actuator over a first range of movement that is larger than the second range of movement, the method comprising:

controlling the secondary actuator to extend the secondary actuator from a predetermined location within the second range of movement and move the transducer toward a target track on the disk while seeking;

controlling the primary actuator to move the secondary actuator toward the target track while simultaneously controlling the secondary actuator to retract the secondary actuator to the predetermined location while maintaining the transducer aligned with the target track; and initiating at least one of reading and writing data on the target track of the disk before the secondary actuator is retracted back to the predetermined location.

2. The method of claim 1, wherein the predetermined location corresponds to a median location within the second range of movement.

3. The method of claim 1, further comprising delaying a subsequent seek from the target track to another track until the secondary actuator is retracted to within a predetermined offset from the predetermined location within the second range of movement.

4. The method of claim 3, wherein the subsequent seek is delayed until the secondary actuator is retracted to about the predetermined location within the second range of movement.

5. The method of claim 1, wherein:
the secondary actuator is controlled based on at least one of reducing seek time and reducing track misregistration while the transducer is maintained on the target track; and
the primary actuator is controlled based on at least one of reducing vibration and reducing track misregistration while the transducer is maintained on the target track.

6. The method of claim 1, wherein controlling the primary actuator to move the secondary actuator toward the target track while simultaneously controlling the secondary actuator to maintain the transducer on the target track comprises moving the primary actuator along a first trajectory while moving the secondary actuator along a second trajectory, wherein the first trajectory and the second trajectory substantially cancel to maintain the transducer on the target track.

7. The method of claim 1, wherein:
controlling the primary actuator comprises moving the secondary actuator at a first rate toward the target track; and
controlling the secondary actuator comprises moving the transducer at a second rate toward the target track that is greater than the first rate.

8. The method of claim 1, wherein controlling the secondary actuator to move the transducer toward a target track on the disk while seeking comprises moving the transducer from an initial track to the target track.

9. The method of claim 1, further comprising:
determining whether a seek distance from an initial track to the target track is within the second range of movement; and
selectively carrying out a seek of the transducer to the target track by control of the secondary actuator based on the determination.

10. The method of claim 1, wherein:
controlling the secondary actuator to move the transducer toward a target track on the disk while seeking comprises moving the transducer from an initial track toward the target track; and
controlling the primary actuator to move the secondary actuator toward the target track while simultaneously controlling the secondary actuator to maintain the transducer on the target track comprises moving the transducer to the target track.

11. The method of claim 10, wherein the secondary actuator and the primary actuator are simultaneously controlled to move the transducer from the initial track to the target track.

12. A method of controlling seeking of a transducer that is adjacent to a rotatable data storage disk in a disk drive, the disk drive having a secondary actuator for positioning the transducer over a second range of movement, and a primary actuator for positioning the secondary actuator over a first range of movement that is larger than the second range of movement, the method comprising:
controlling the secondary actuator to move the transducer toward a target track on the disk while seeking;
controlling the primary actuator to move the secondary actuator toward the target track while simultaneously controlling the secondary actuator to maintain the transducer on the target track, wherein controlling the secondary actuator comprises extending the secondary actuator, and controlling the primary actuator comprises moving the secondary actuator toward the target track while retracting the secondary actuator until the secondary actuator is retracted to about a predetermined location within the second range of movement;
determining whether a seek distance for a subsequent seek from the target track to another track is at least a threshold distance; and
selectively allowing the subsequent seek when the seek distance is determined to be at least the threshold distance, and delaying the subsequent seek, when the seek distance is determined to be less than the threshold distance, until the secondary actuator is retracted to within a predetermined offset from a predetermined location within the second range of movement.

13. The method of claim 12, further comprising retracting the secondary actuator toward the predetermined location while carrying out the subsequent seek when the seek distance is determined to be at least the threshold distance.

14. A method of controlling seeking of a transducer that is adjacent to a rotatable data storage disk in a disk drive, the disk drive having a secondary actuator for positioning the transducer over a second range of movement, and a primary actuator for positioning the secondary actuator over a first range of movement that is larger than the second range of movement, the method comprising:
controlling the secondary actuator to move the transducer toward a target track on the disk while seeking;
controlling the primary actuator to move the secondary actuator toward the target track while simultaneously controlling the secondary actuator to maintain the transducer on the target track;
determining whether a seek direction for a subsequent seek from the target track to another track is toward the initial track; and
selectively allowing the subsequent seek when the seek direction is determined to be toward the initial track, and delaying the subsequent seek, when the seek direction is determined to be away from the initial track, until the secondary actuator is retracted to within a predetermined offset from a predetermined location within the second range of movement.

15. A disk drive comprising:
a data storage disk;
a transducer configured to read data from the disk and/or to write data to the disk;
a secondary actuator that is configured to position the transducer relative to the disk over a second range of movement;
a primary actuator that is configured to position the secondary actuator relative to the disk over a first range of movement that is larger than the second range of movement; and
a controller that is configured to seek the transducer to a target track on the disk by controlling the secondary actuator to extend the secondary actuator from a predetermined location within the second range of movement and move the transducer toward the target track, and controlling the primary actuator to move the secondary actuator toward the target track while simultaneously controlling the secondary actuator to retract the secondary actuator to the predetermined location while maintaining the transducer aligned with the target track, and is further configured to initiate at least one of reading and writing data on the target track of the disk before the secondary actuator is retracted back to the predetermined location.

16. The disk drive of claim 15, wherein:
the primary actuator is configured to coarsely position the transducer; and
the secondary actuator is configured to finely position the transducer.

17. The disk drive of claim 16, wherein:
the primary actuator comprises a voice coil motor; and
the secondary actuator comprises a microactuator.

18. The disk drive of claim 15, wherein the controller is configured to delay a subsequent seek from the target track to another track until the secondary actuator is retracted to within a predetermined offset from the predetermined location within the second range of movement.

19. The disk drive of claim 15, wherein the controller is configured to control movement of the secondary actuator based on at least one of reducing seek time and reducing track misregistration while the transducer is maintained on the target track, and to control movement of the primary actuator based on at least one of reducing vibration and reducing track misregistration while the transducer is maintained on the target track.

20. The disk drive of claim 15, wherein the controller is configured to move the primary actuator along a first trajectory while moving the secondary actuator along a second trajectory, wherein the first trajectory and the second trajectory substantially cancel to maintain the transducer on the target track.

21. The disk drive of claim 15, wherein the controller is configured to control the primary actuator to move the secondary actuator at a first rate toward the target track, and configured to control the secondary actuator to move the transducer at a second rate toward the target track that is greater than the first rate.

22. The disk drive of claim 15, wherein the controller is configured to determine whether a seek distance from an initial track to a target track is within the second range of movement, and to selectively carry out a seek of the transducer to the target track by control of the secondary actuator based on the determination.

23. The disk drive of claim 15, further comprising:
a base, wherein the disk is rotatably mounted to the base;
an actuator arm comprising first and second members, wherein the first member is connected between the base and the second member, wherein the transducer is coupled to the second member, wherein the primary actuator is configured to move the first member relative to the base, and wherein the secondary actuator is configured to move the second member relative to the first member.

24. A disk drive comprising:
a data storage disk;
a transducer configured to read data from the disk and/or to write data to the disk;
a secondary actuator that is configured to position the transducer relative to the disk over a second range of movement;
a primary actuator that is configured to position the secondary actuator relative to the disk over a first range of movement that is larger than the second range of movement; and
a controller that is configured to seek the transducer to a target track on the disk by controlling the secondary actuator to move the transducer toward the target track, and controlling the primary actuator to move the secondary actuator toward the target track while simultaneously controlling the secondary actuator to maintain the transducer on the target track, wherein the controller is configured to extend the secondary actuator to move the transducer toward the target track, and configured to control the primary actuator to move the secondary actuator toward the target track while retracting the secondary actuator until the secondary actuator is retracted to about a predetermined location within the second range of movement, and is further configured to determine whether a seek distance for a subsequent seek from the target track to another track is at least a threshold distance, and configured to selectively allow the subsequent seek when the seek distance is determined to be at least the threshold distance, and to delay the subsequent seek, when the seek distance is determined to be less than the threshold distance, until the secondary actuator is retracted to within a predetermined offset from a predetermined location within the second range of movement.

25. The disk drive of claim 24, wherein the controller is configured to retract the secondary actuator toward the predetermined location while carrying out the subsequent seek when the seek distance is determined to be at least the threshold distance.

26. A disk drive comprising:
a data storage disk;
a transducer configured to read data from the disk and/or to write data to the disk;
a secondary actuator that is configured to position the transducer relative to the disk over a second range of movement;
a primary actuator that is configured to position the secondary actuator relative to the disk over a first range of movement that is larger than the second range of movement; and
a controller that is configured to seek the transducer to a target track on the disk by controlling the secondary actuator to move the transducer toward the target track, and controlling the primary actuator to move the secondary actuator toward the target track while simultaneously controlling the secondary actuator to maintain the transducer on the target track, and is further configured to determine whether a seek direction for a subsequent seek from the target track to another track is toward the initial track, and configured to selectively allow the subsequent seek when the seek direction is determined to be toward the initial track, and delaying the subsequent seek, when the seek direction is determined to be away from the initial track, until the secondary actuator is retracted to within a predetermined offset from a predetermined location within the second range of movement.

27. A computer program product for controlling seeking of a transducer that is adjacent to a rotatable data storage disk in a disk drive, the disk drive having a secondary actuator for positioning the transducer over a second range of movement, and a primary actuator for positioning the secondary actuator over a first range of movement that is larger than the first range of movement, the computer program product comprising computer program code embodied in a computer-readable storage medium, the computer program code comprising:
computer program code that is configured to control the secondary actuator to move the transducer toward a target track on the disk while seeking;

computer program code that is configured to control the primary actuator to move the secondary actuator toward the target track and to simultaneously control the secondary actuator to maintain the transducer on the target track;

computer program code that is configured to extend the secondary actuator;

computer program code that is configured to move the secondary actuator toward the target track while retracting the secondary actuator until the secondary actuator is retracted to about a predetermined location within the second range of movement; and computer program code that is configured to determine whether a seek distance for a subsequent seek from the target track to another track is at least a threshold distance, and configured to selectively allow the subsequent seek when the seek distance is determined to be at least the threshold distance, and to delay the subsequent seek, when the seek distance is determined to be less than the threshold distance, until the secondary actuator is retracted to within a predetermined offset from a predetermined location within the second range of movement.

* * * * *